United States Patent
Markiewicz

(10) Patent No.: US 10,133,514 B2
(45) Date of Patent: *Nov. 20, 2018

(54) FLUSHLESS TRANSACTIONAL LAYER

(71) Applicant: Microsoft Technology Licensing, LLC, Redmond, WA (US)

(72) Inventor: Marcus Eduardo Markiewicz, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/715,002

(22) Filed: Sep. 25, 2017

(65) Prior Publication Data

US 2018/0011664 A1 Jan. 11, 2018

Related U.S. Application Data

(63) Continuation of application No. 14/921,044, filed on Oct. 23, 2015, now Pat. No. 9,778,879.

(51) Int. Cl.
*G06F 3/06* (2006.01)
*G06F 12/0868* (2016.01)
*G06F 9/00* (2006.01)
*G06F 9/46* (2006.01)

(52) U.S. Cl.
CPC ............ *G06F 3/0659* (2013.01); *G06F 3/061* (2013.01); *G06F 3/0619* (2013.01); *G06F 3/0656* (2013.01); *G06F 3/0676* (2013.01); *G06F 9/00* (2013.01); *G06F 9/46* (2013.01); *G06F 12/0868* (2013.01); *G06F 2212/1016* (2013.01); *G06F 2212/1032* (2013.01); *G06F 2212/21* (2013.01);

(Continued)

(58) Field of Classification Search
CPC ...... G06F 3/0659; G06F 3/061; G06F 3/0619; G06F 3/0676; G06F 12/0868; G06F 2212/1016; G06F 2212/1032; G06F 2212/21; G06F 2212/281; G06F 3/0656; G06F 9/00; G06F 9/46; G06F 2212/311
See application file for complete search history.

(56) References Cited

U.S. PATENT DOCUMENTS 5,524,203 A 6/1996 Abe
5,603,062 A 2/1997 Sato et al.
5,778,426 A 7/1998 DeKoning et al.
(Continued)

OTHER PUBLICATIONS

Faibish, et al., "A New Approach to File System Cache Writeback of Application Data", In Proceedings of the 3rd Annual Haifa Experimental Systems Conference, May 24, 2010, 12 pgs.
(Continued)

*Primary Examiner* — Hiep Nguyen

(57) ABSTRACT

Writing data to storage utilizing a diverged thread for asynchronous write operations is provided. On a first thread, an analysis engine analyzes and identifies changed information to write to storage and an I/O manager copies the writes into buffers and places the buffers into a queue, while on a second thread, a flushless transactional layer (FTL) drive executes the writes to storage. By allowing the analysis to continue and enqueue writes on a first thread while the writes are written to storage on a second thread, the CPU and I/O of the system are utilized in parallel. Accordingly, efficiency of the computing device is improved.

20 Claims, 6 Drawing Sheets

(52) U.S. Cl.
CPC .. *G06F 2212/281* (2013.01); *G06F 2212/311* (2013.01)

(56) References Cited

U.S. PATENT DOCUMENTS

| | | | |
|---|---|---|---|
| 6,983,339 B1 | 1/2006 | Rabe et al. | |
| 8,255,645 B2 | 8/2012 | Ergan et al. | |
| 8,402,226 B1 | 3/2013 | Faibish et al. | |
| 8,566,522 B2 | 10/2013 | Shea | |
| 8,768,890 B2 | 7/2014 | Burchall et al. | |
| 9,058,326 B1 | 6/2015 | Hamel et al. | |
| 9,778,879 B2* | 10/2017 | Markiewicz | G06F 3/0659 |
| 2005/0240803 A1 | 10/2005 | Saika et al. | |
| 2008/0021902 A1 | 1/2008 | Dawkins et al. | |
| 2009/0164738 A1 | 6/2009 | Erfani et al. | |
| 2013/0159646 A1 | 6/2013 | Atzmon et al. | |
| 2013/0254246 A1 | 9/2013 | Lipcon | |
| 2014/0089596 A1 | 3/2014 | McKenney | |
| 2014/0095771 A1 | 4/2014 | Lee et al. | |
| 2014/0181397 A1 | 6/2014 | Bonzini | |
| 2014/0215127 A1 | 7/2014 | Perrin et al. | |
| 2015/0135003 A1 | 5/2015 | Cota-Robles et al. | |
| 2015/0155044 A1 | 6/2015 | Yin et al. | |
| 2016/0098219 A1 | 4/2016 | Nakata | |
| 2017/0115931 A1 | 4/2017 | Markiewicz | |

OTHER PUBLICATIONS

"Flushing System-Buffered I/O Data to Disk", Published on: Oct. 14, 2013, 1 pg. Available at: https://msdn.microsoft.com/en-us/library/windows/desktop/aa364451%28v=vs.85%29.aspx.

Zhang, Sam, "File Write-Through Behavior in Live Smooth Streaming Archiving", Published on: Nov. 17, 2011, 2 pgs. Available at: http://blogs.iis.net/samzhang/file-write-through-behavior-in-live-smooth-streaming-archiving.

Apache Kafka, Kafka 0.8.0 Documentation, "Understanding Linux OS Flush Behavior", Published on: Aug. 15, 2013, 60 pgs. Available at: http://kafka.apache.org/documentation.html.

* cited by examiner

MOBILE COMPUTING DEVICE

FLUSHLESS TRANSACTIONAL LAYER

RELATED APPLICATION

This application is a Continuation of co-pending U.S. application Ser. No. 14/921,044 entitled "Flushless Transactional Layer" filed Oct. 23, 2015, which is incorporated herein by reference.

BACKGROUND

Many computing architectures implement cache as a means for addressing a mismatch between the performance characteristics of a computing device's storage device (e.g., magnetic recording media, solid state storage) and the performance requirements of the device's central processing unit (CPU) and application processing. For example, when an application issues a write command, the system may write the data into the cache, where periodically, the data from the cache is flushed to the storage device.

However, flushing a write cache is an expensive operation, which can degrade performance. When flushing data from the cache to the storage device, the storage device flushes the entire system. That is, the storage device writes everything in the cache for all drives to storage, which can cause a computing device to incur a performance penalty, particularly on a low-end device with a limited bandwidth input/output (I/O) subsystem. Additionally, there may be a risk of loss or corruption of data if power is lost while there is data in the disk's write cache that has not been written to storage.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an improved write transaction, including improved systems, methods, and computer readable media, for writing data to storage utilizing a diverged thread for asynchronous write operations. On a first thread, an analysis engine analyzes and identifies changed information to write to storage and an I/O manager copies the writes into buffers and places the buffers into a queue, while on a second thread, a flushless transactional layer (FTL) drive executes the writes to storage. By allowing the analysis to continue and enqueue writes on a first thread while the data is written to storage on a second thread, the CPU and I/O of the system are utilized in parallel. Accordingly, efficiency of the computing device is improved.

Examples are implemented as a computer process, a computing system, or as an article of manufacture such as a computer program product or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
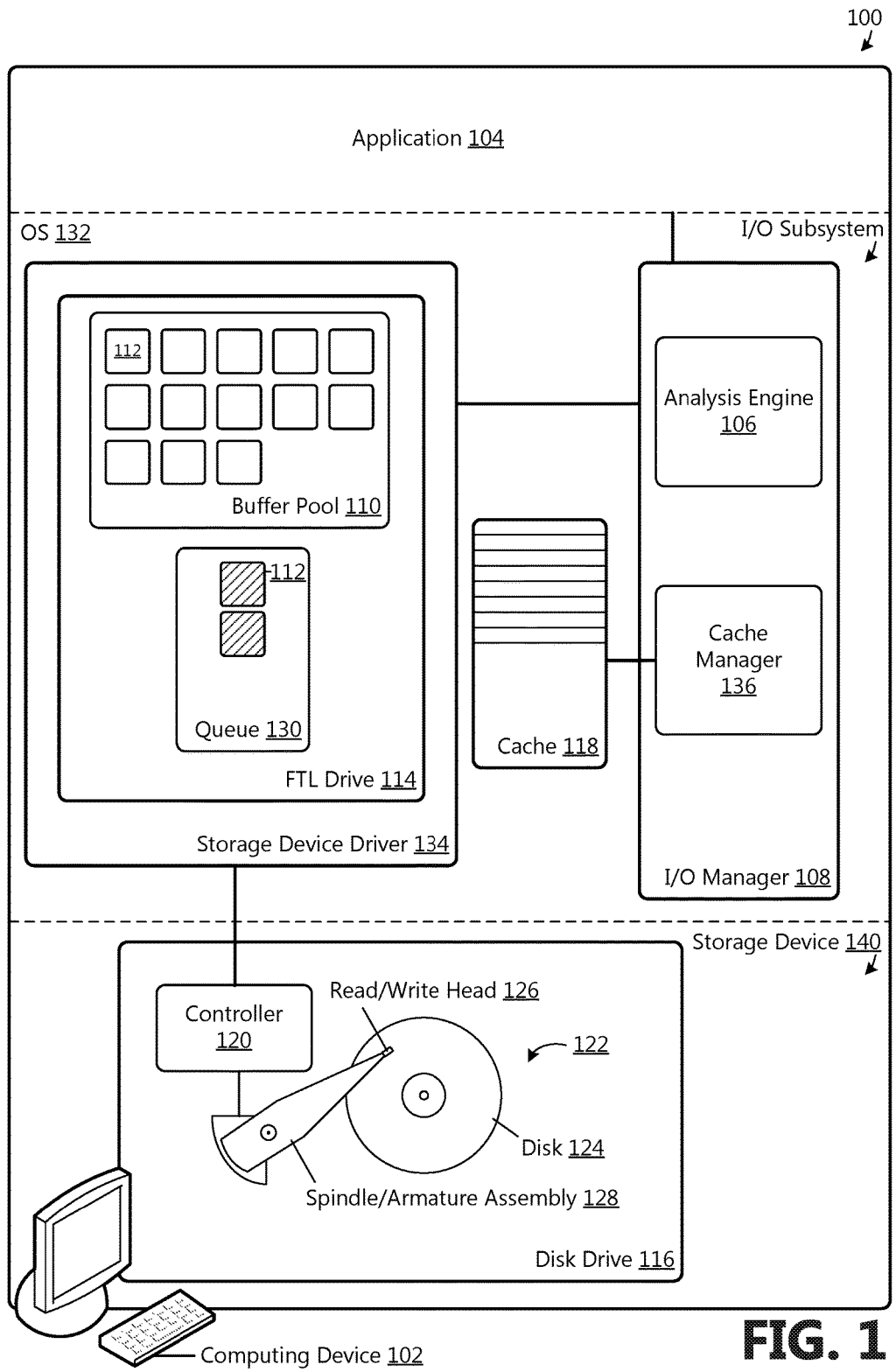
FIG. 1 is a simplified block diagram showing an example operating environment and components of an example flushless transactional system.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and device for processing a write transaction to storage utilizing a diverged thread for asynchronous write operations. On a first thread, an analysis engine analyzes and identifies changed information to write to storage and an I/O manager copies the writes into buffers and places the buffers into a queue. Concurrently, on a second thread, a flushless transactional layer (FTL) drive executes the writes to storage. Accordingly, the CPU and I/O of the system are utilized in parallel.

With reference now to FIG. 1, a simplified block diagram of one example of an operating environment 100 for a flushless transactional system is shown. The example system includes a computing device 102 in the form of a desktop computer, laptop computer, tablet computer, handheld computing device, mobile communication device, wearable device, gaming device, and the like. The computing device 102 includes a non-volatile storage device 140 for booting the computing operating system (OS) 132, storing applications, and storing data. In some examples and as illustrated in FIG. 1, the storage device 140 is a disk drive 116 having a disk assembly 122 that includes a non-volatile memory storage medium such as one or more disks 124, a read/write head 126 for reading and writing to the disk 124, and a spindle/armature assembly 128 for moving the read/write head 126 to locations on the disk 124. A controller 120 commands the disk assembly 122 to read data from the disk 124 or write data to the disk 124. Although illustrated as a disk drive 116, in some examples, the storage device 140 is a solid state device, where data is electronically stored on interconnected flash memory chips.

The OS 132 is illustrative of a hardware device, firmware system, or software system operative to manage the computing device's 102 resources (e.g., central processing unit (CPU), memory, disk drives, I/O devices, etc., establish a user interface, and execute and provide services for applications 104.

The flushless transactional system includes at least one application 104 executing on the computing device 102. For example, the application 104 is operable to access, modify, or generate data. The application 104 may be one of various types of applications or a suite of applications, such as, but not limited to, an electronic mail and contacts application, a word processing application, a spreadsheet application, a database application, a slide presentation application, a drawing or computer-aided drafting application program, a personal information management application, an Internet browser application, etc.

The application 104 is operable to issue an I/O command, such as an application programming interface (API) call to write data to storage. According to an example, the application 104 issues the write request to an I/O manager 108. For example, in response to a user-initiated save function, automated save function, open function of a file, etc., the application 104 generates a persisted model of the data file including data content and metadata (e.g., formatting, style), which is sent in a data packet with the write request.

The computing device 102 is comprised of various devices that provide I/O to and from the outside world (e.g., keyboards, mice, audio controllers, video controllers, disk drives 116, networking ports). Device drivers, such as storage device driver 134, provide the software connection between the various devices and the OS 132. The I/O manager 108 is illustrative of a hardware device, firmware system, or software system operative to manage the communication between applications (e.g., application 104) and interfaces provided by device drivers. For example, the I/O manager 108 is operative to manage communication between the application 104 and the storage device driver 134, such as a write request issued by the application 104.

The storage device driver 134 is illustrative of a hardware device, firmware system, or software system that operates or controls the storage device 140 (e.g., disk drive 116 or SSD). The storage device driver 134 may serve as a software or hardware interface to the storage device 140 (e.g., disk drive 116) for enabling the OS 132 or other applications (e.g., application 104) to access functions of the data storage device 140 without needing to know operating details of the data storage device 140. That is, the storage device driver 134 acts as a translator between the OS 132 and the data storage device 140.

When the I/O manager 108 receives a write request, the I/O manager 108 is operative to call an analysis engine 106 to determine the data to write to storage. For example, the analysis engine 106 determines differences between the generated persisted model of the data file generated by the application 104 and sent with the write request and a last-saved version of the data file. The analysis engine 106 is illustrative of a hardware device, firmware system, or software system operative to perform a read of the data file, perform a read of the latest version of the data file last written to storage, and analyze the data files for identifying changed information made since the last save.

According to an example, the last-saved version of the data file is read into a cache 118 managed by a cache manager 136. The cache manager 136 is illustrative of a hardware device, firmware system, or software system that is operative to read data from the storage device 140, and temporarily store data files for fulfillment of future requests for the data. For example, when the last-saved version of the data file is stored in the cache 118, the cache manager 136 fulfills a request by the analysis engine 106 to read the last-saved version of the data file from the cache 118 for its analysis.

According to an aspect, for each cached file in the cache 118, the cache 118 stores metadata, such as synchronization information, endpoint connection information, etc. According to an example, a cached file's contents are broken into pieces or a collection of blobs and stored in a container file in the cache 118. The container file includes a header comprising various pieces of information, such as an identifier for the version of the container file, location of a transaction log used to produce the current state of the data, etc.

The flushless transactional system includes an FTL drive 114, which is included in or operationally attached to the storage device driver 134. The I/O manager 108 is operative to reroute a write request to the FTL drive 114. For example, the I/O manager 108 collects the changed information writes determined by the analysis engine 106, and copies the writes into a queue 130 within the FTL drive 114. The FTL drive 114 is illustrative of a device, device firmware, or software application that comprises the queue 130 and a buffer pool 110 comprising a plurality of buffers 112, and is operative to enqueue the writes in the buffers 112 and execute the writes to the storage device 140 (e.g., the disk drive 116). According to an aspect, the FTL drive 114 enqueues and issues the writes to be written directly to the storage device 140 rather than to a cache and later flushed to the storage device 140.

According to an example, the system processes a write transaction on two parallel threads: as the analysis engine 106 analyzes and identifies writes and the I/O manager 108 copies the writes into buffers 112 and places the buffers 112 into the queue 130 on a first thread, the FTL drive 114 executes the writes on a second thread.

According to an aspect, by allowing the analysis to continue and enqueue writes on a first thread while the data is written to storage on a second thread, the CPU and I/O of the system are utilized in parallel. Accordingly, efficiency of the computing device 102 is improved. For example, flushing the cache 118 is an expensive process, as everything in memory is written to disk 124. Automatically writing changes made to a data file to disk instead of writing to cache 118 and performing a large volume write to disk at the end levels out computational resource usage. Accordingly, the save process is faster and applications (e.g., application 104) are not impacted by waiting for a flush to complete. Thus, the user experience is improved, as a user of the application 104 does not have to wait for everything in the system cache to write to disk before continuing to use the application 104.

Figure 2:
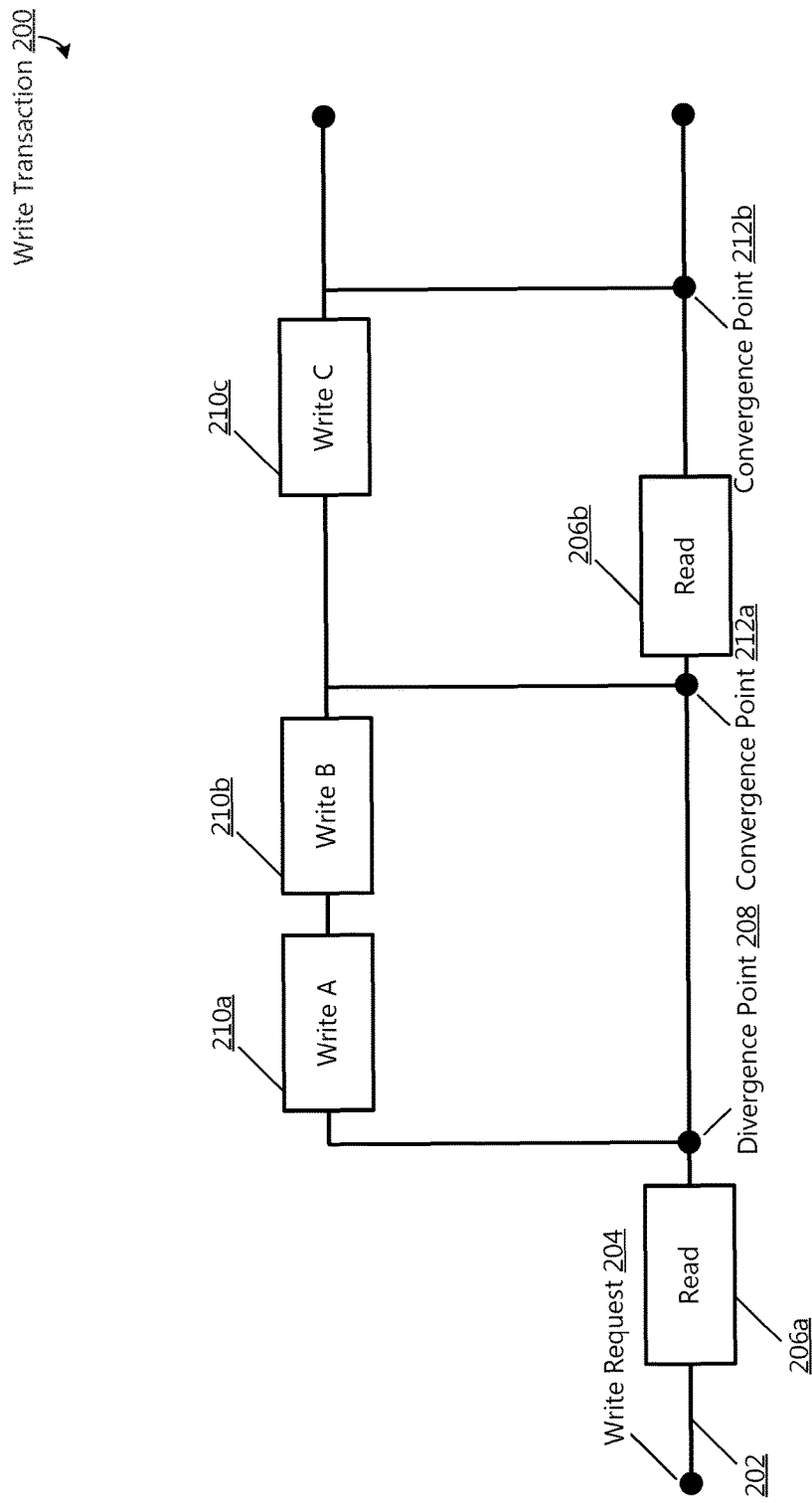
FIG. 2 is an illustration of an example write transaction.

With reference now to FIG. 2, an example write transaction 200 is illustrated. According to the illustrated example, the lower line is illustrative of a first thread in the application code 202. For example, when a write request 204 is issued by the application 104 for a data file, the application 104 creates a stream of data, which may include the data file's content and metadata generated or modified by a user of the application 104. A first read operation 206a is performed by the analysis engine 106, where the data stream generated by the application 104 is read and compared against the last saved version of the data file for identifying changes to the data file since the last save to the disk drive 116. Additionally, the I/O manager 108 pulls one or more free buffers 112 from the buffer pool 110, copies the one or more changed information writes identified by the analysis engine 106 into the free buffers 112, and places the buffers 112 into the FTL drive queue 130. The number of write operations 210a-n (collectively, 210) is dependent on the size of the data to be written.

As illustrated, a single divergence point 208 occurs in the write transaction 200 at a first write operation 210a, when, on a separate thread, the FTL drive 114 pulls a filled buffer 112 from the queue, and executes the enqueued write to storage (e.g., the disk drive 116), and returns the now free buffers 112 to the buffer pool 110 for reuse as new write calls are made. When the queue 130 is empty, the write to disk is complete.

One or more convergence points 212a,b (collectively, 212) occur in the write transaction 200 to ensure that all write operations 210 are finished before proceeding. For example and as illustrated, a convergence point 212a before the second read operation 206b occurs when the I/O manager 108 ensures that the write operations 210 are finished before proceeding. For example, the I/O manager 108 determines whether the queue 130 is empty or whether there are additional buffered writes that have not been written to storage. If the queue 130 is not empty, the I/O manager 108 waits in blocks for the write operations 210 to finish. According to an example, the convergence point 212 provides a guarantee that a next read operation 206b will pick up on the changes made by the write operations 210. As illustrated, a final convergence point 212b occurs at transaction commit. For example, the final convergence point 212b brings the system to a coherent state at the end of the write transaction 200.

Figure 3:
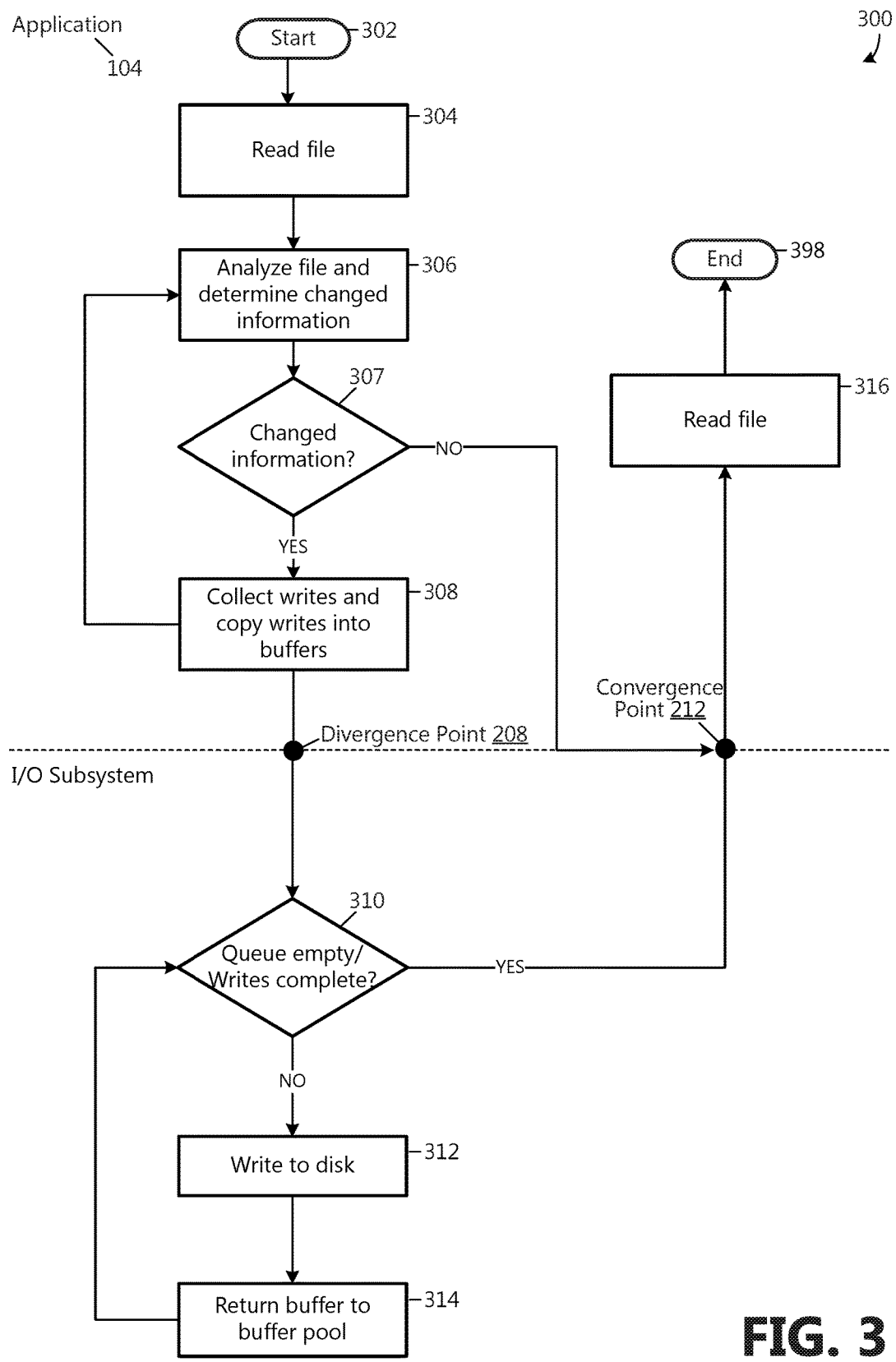
FIG. 3 is a flow chart showing general stages involved in an example method for writing data to storage utilizing a diverged thread for asynchronous write operations.

Having described an operating environment, a write transaction 200 example, and various aspects with respect to FIGS. 1-2, FIG. 3 illustrates a flow chart showing general stages involved in an example method 300 for flushless writing of data to disk. The method 300 begins at start operation 302, where an application 104 issues a write request 204 in response to a user-initiated save function, an automated save function, an open function of a file, etc. The method 300 proceeds to a data stream generation operation 304, where the application 104 generates a stream of data and metadata to be written to storage (e.g., to the disk drive 116).

The method 300 proceeds to an analysis operation 306, where the analysis engine 106 performs a read of the data stream and a read of the data file written to the disk drive 116 for determining changes made to the data file since the last save to storage (e.g., the disk drive 116).

The method 300 proceeds to an analysis decision operation 307, where a determination is made as to whether there is change information to write to storage. When the analysis engine 106 identifies change information, the method 300 proceeds to a buffer write operation 308, where the I/O manager 108 collects the identified changes to write to storage, copies the writes into one or more free buffers 112 stored in the buffer pool 110, and places the one or more filled buffers 112 into the queue 130. According to an aspect, the analysis operation 306, the analysis decision operation 307, and the buffer write operation 308 continue in parallel on a first thread as the method 300 proceeds to operations 310-314.

A divergence point 208 occurs in the write transaction 200 as the method 300 proceeds to a queue status determination operation 310, where a determination is made as to whether the queue 130 is empty or whether there are filled buffers 112 that are enqueued. If a determination is made that the queue 130 is not empty, the method 300 proceeds to a write operation 312, where the FTL drive 114 pulls a filled buffer 112 from the queue 130, and executes the write to storage. For example, the FTL drive 114 issues a command to the controller 120 via the storage device driver 134 to write the data to the storage device 140 (e.g., the hard drive 116 to write to the disk 124).

The method 300 then proceeds to a buffer return operation 314, where the FTL drive 114 returns the now-empty buffer 112 to the buffer pool 110 so that it can be reused for additional writes. The method 300 then returns to the queue status determination operation 310.

If a determination is made that the queue 130 is not empty at the queue status determination operation 310, the FTL drive 114 continues to issue the writes to storage, and the I/O manager 108 waits for the writes to complete.

If a determination is made that the queue 130 is empty at the queue status determination operation 310, a convergence point 212 occurs in the write transaction 200 as the method 300 proceeds to a cache synchronization operation 316, where the cache is updated correspondingly with the changes made by the write operations 210. For example, a new transaction log record describing the writes is added to the cache 118, and the system is brought to a coherent state at the end of the write transaction 200. The method 300 ends at operation 398.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
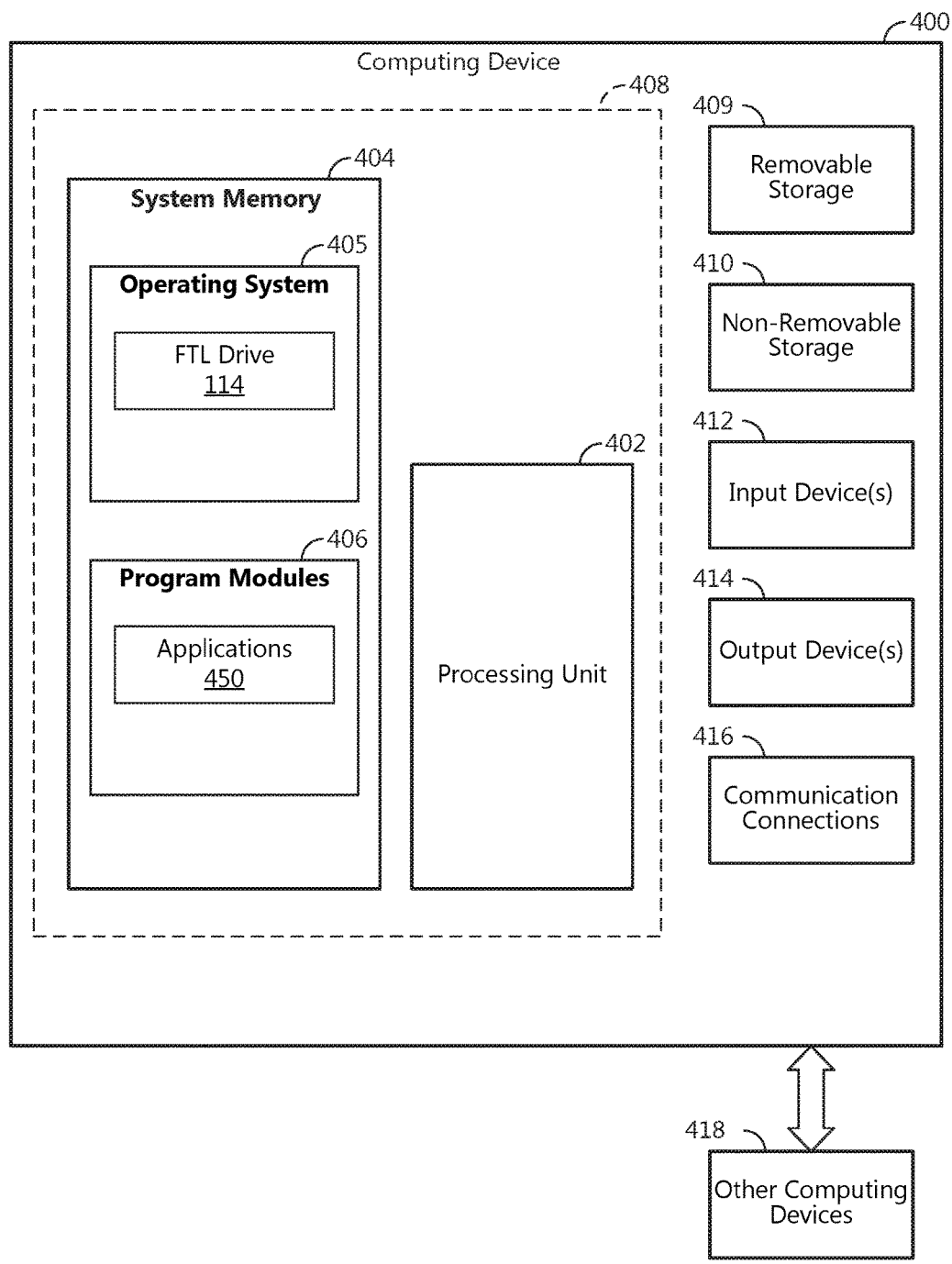
FIG. 4 is a block diagram illustrating example physical components of a computing device.

FIGS. 4-6 and the associated descriptions provide a discussion of a variety of operating environments in which examples are practiced. However, the devices and systems illustrated and discussed with respect to FIGS. 4-6 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure are be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405/132 and one or more program modules 406 suitable for running software applications 450/104. The operating system 405/132, for example, is suitable for controlling the operation of the computing device 400. According to an aspect, the operating system 405/132 includes the FTL drive 114. Furthermore, aspects are practiced in conjunction with a graphics library, other operating systems, or any other application program, and is not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 5A:
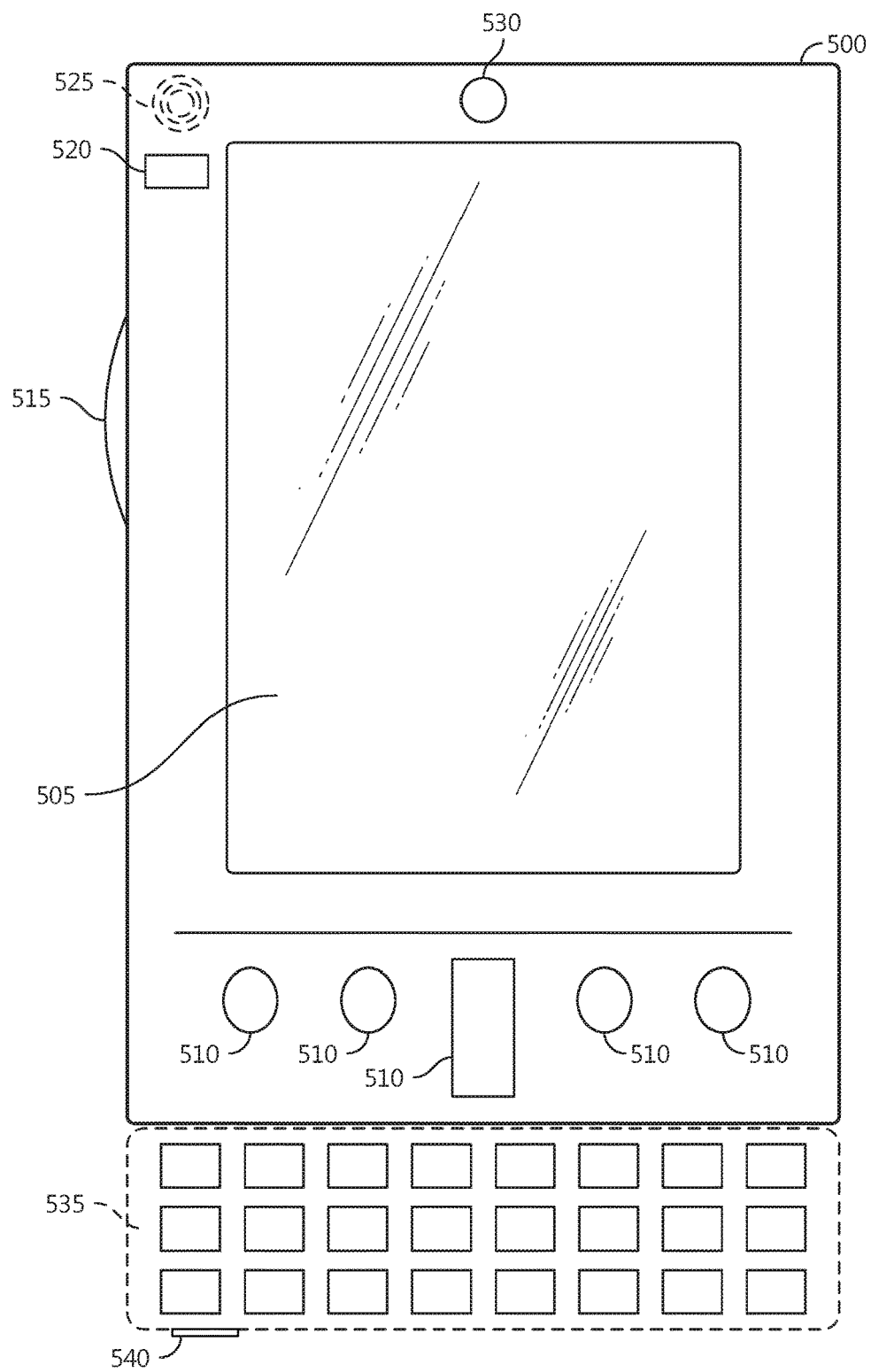
FIGS. 5A and 5B are simplified block diagrams of a mobile computing device.
Figure 5B:
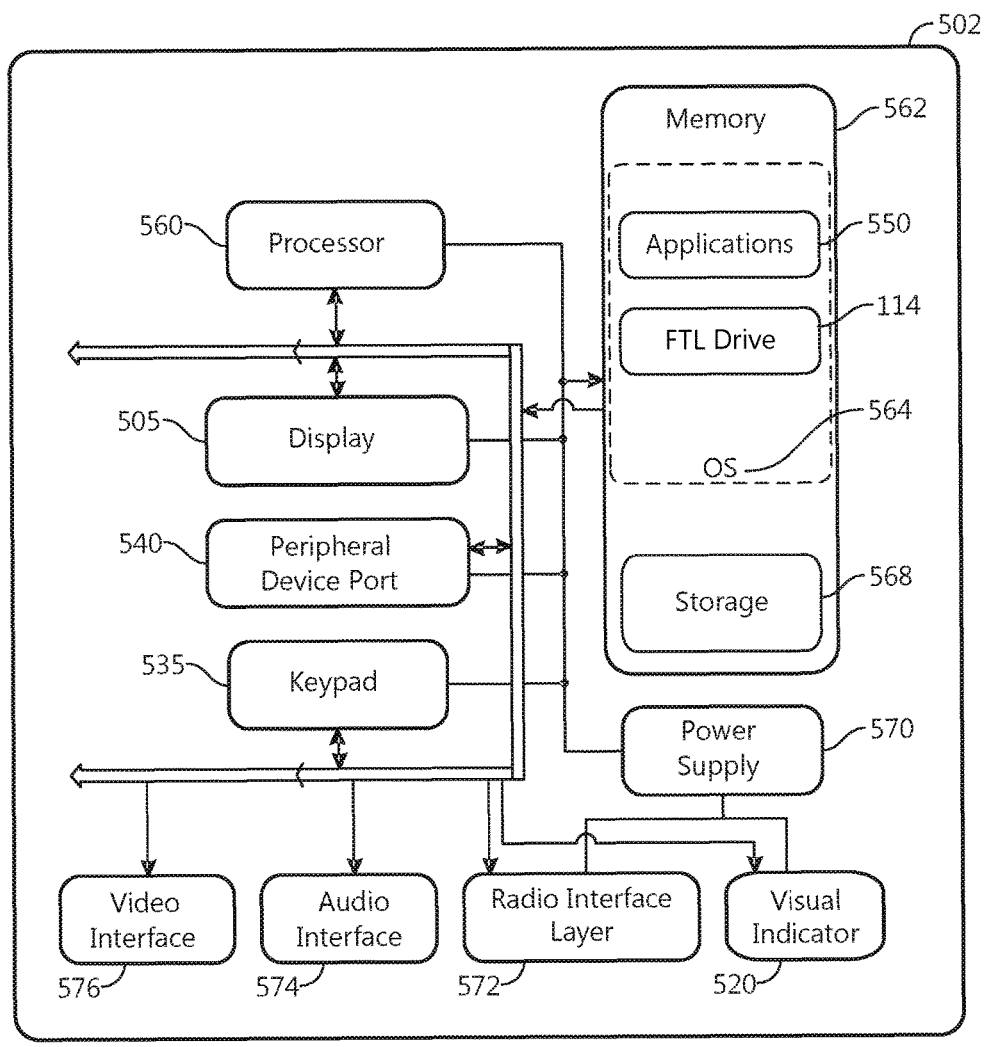

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550/104 are loaded into the memory 562 and run on or in association with the operating system 564/108. Examples of the application programs include phone dialer programs, e-mail programs, personal information management (PIM) programs, word processing programs, spreadsheet programs, Internet browser programs, messaging programs, and so forth. According to an aspect, the FTL drive 114 is loaded into memory 562. The system 502 also includes a non-volatile storage area 568 within the memory 562. The non-volatile storage area 568 is used to store persistent information that should not be lost if the system 502 is powered down. The application programs 550/104 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564/108. In other words, communications received by the radio 572 may be disseminated to the application programs 550/104 via the operating system 564/108, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A computer-implemented method for writing data to a storage driver, comprising:
   receiving a write request at an I/O manager to write data to a storage driver;
   establishing a divergence point by the I/O manager from a first thread to a second thread based on the write request;
   on the first thread, processing the write request and storing one or more writes of data in a queue;
   on the second thread, a flushless transaction layer manager executing the one or more writes of data to the storage driver, wherein the second thread executes the one or more writes of data to the storage driver asynchronously while the first thread continues to process the write request and store writes of data in the queue; and
   receiving by the I/O manager an indication of a completion of executing the one or more writes of data to the storage driver, wherein the indication of the completion establishes a convergence of the first thread and the second thread.

2. The computer-implemented method of claim 1, wherein the storage driver writes to magnetic recording media or solid state storage.

3. The computer-implemented method of claim 1, wherein processing the write request comprises analyzing the data for identifying one or more pieces of changed information.

4. The computer-implemented method of claim 3, wherein storing one or more writes of data in a queue comprises:
   copying the one or more pieces of changed information in one or more buffers; and
   placing the one or more buffers in the queue.

5. The computer-implemented method of claim 4, wherein executing the one or more writes of data to the storage driver comprises:
   determining whether the queue is empty; and
   when the queue is not empty, issuing a command to a storage driver controller to write the changed information in the buffer to a storage medium.

6. The computer-implemented method of claim 1, wherein after convergence of the first thread and the second thread, reading the stored data into a cache.

7. A system for writing data to storage, comprising:
   one or more processors for executing programmed instructions;
   memory, coupled to the one or more processors, for storing program instruction steps for execution by the one or more processors;
   an I/O manager operable to:
      receive a write request to write data to a storage driver;
      establish a divergence point from a first thread to a second thread;
      process the write request; and
      store one or more writes of data in a queue; and
   a flushless transactional layer drive operable to execute the one or more writes of data to the storage driver on the second thread and further operable to execute the one or more writes of data to the storage driver asynchronously while the I/O manager continues to process the write request and store writes of data in the queue.

8. The system of claim 7, wherein the I/O manager is further operable to receive an indication of a completion of executing the one or more writes of data to the storage driver.

9. The system of claim 8, wherein the indication of the completion establishes a convergence of the first thread and the second thread.

10. The system of claim 7 wherein the storage driver writes to magnetic recording media or solid state storage.

11. The system of claim 7, wherein in processing the write request, the I/O manager is operable to call an analysis engine to analyze the data for identifying one or more pieces of changed information.

12. The system of claim 11, wherein in storing one or more writes of data in a queue, the I/O manager is operable to:
   copy the one or more pieces of changed information in one or more buffers; and
   place the one or more buffers in a queue.

13. The system of claim 12, wherein in executing the one or more writes of data to the storage driver, the flushless transactional layer drive is operable to:
   determine whether the queue is empty; and
   when the queue is not empty, issue a command to a storage device controller to write the changed information in the buffer to a storage medium.

14. The system of claim 7, wherein after convergence of the first thread and the second thread, the I/O manager is further operable to read the stored data into a cache.

15. One or more computer storage media storing computer-usable instructions that, when used by one or more computing devices, cause the one or more computing devices to perform a method for writing data to storage, the method comprising:
   receiving a write request to write data to a storage driver;
   establishing a divergence point from a first thread to a second thread based on the write request;
   on the first thread, the one or more computing devices:
      analyzing the data for identifying changed information from a last-saved version;
      copying the changed information into one or more empty buffers; and
      enqueuing the one or more buffers in a queue; and
   on the second thread, the one or more computing devices:
      executing writes of the changed information from the one or more buffers to the storage driver,
      wherein the second thread executes writes of the changed information from the one or more buffers to the storage driver asynchronously while the first thread continues to process the write request and enqueue changed information.

16. The one or more computer storage media of claim 15, further comprising executing writes of the changed information from the one or more buffers to the storage driver, wherein the indication of the completion establishes a convergence of the first thread and the second thread.

17. The one or more computer storage media of claim 16, wherein after convergence of the first thread and the second thread, reading the stored data into a cache.

18. The one or more computer storage media of claim 15, wherein the storage driver writes to magnetic recording media or solid state storage.

19. The one or more computer storage media of claim 15, wherein executing writes of the changed information from the one or more buffers to the storage driver comprises:
- determining whether the queue is empty; and
- when the queue is not empty, issuing a command to a storage driver controller to write the changed information in the buffer to a storage medium.

20. The one or more computer storage media of claim 15, wherein executing writes of the changed information from the one or more buffers to the storage driver comprises writing the changed information to a disk drive to store on a disk.

\* \* \* \* \*